(12) United States Patent
Lausterer et al.

(10) Patent No.: US 10,917,252 B2
(45) Date of Patent: Feb. 9, 2021

(54) IMPLEMENTING A DIAGNOSIS CAPABILITY OF A NONAUTOMOTIVE CONTROLLER IN AN AUTOMOTIVE ENVIRONMENT

(71) Applicant: Hirschmann Car Communication GmbH, Neckartenzlingen (DE)

(72) Inventors: Markus Lausterer, Neuffen (DE); Roland Boehmert, Reutlingen (DE)

(73) Assignee: HIRSCHMANN CAR COMMUNICATION GMBH, Neckartenzlingen (DE)

( * ) Notice: Subject to any disclaimer, the term of this patent is extended or adjusted under 35 U.S.C. 154(b) by 0 days.

(21) Appl. No.: 16/302,367

(22) PCT Filed: May 19, 2017

(86) PCT No.: PCT/EP2017/062159
§ 371 (c)(1),
(2) Date: Feb. 5, 2019

(87) PCT Pub. No.: WO2017/198844
PCT Pub. Date: Nov. 23, 2017

(65) Prior Publication Data
US 2019/0296921 A1    Sep. 26, 2019

(30) Foreign Application Priority Data

May 19, 2016   (DE) .................. 10 2016 208 671

(51) Int. Cl.
*H04L 12/10* (2006.01)
*G06F 1/26* (2006.01)

(52) U.S. Cl.
CPC .............. *H04L 12/10* (2013.01); *G06F 1/266* (2013.01); *G06F 2213/3812* (2013.01)

(58) Field of Classification Search
CPC ... H04L 12/10; G06F 1/266; G06F 2213/3812
See application file for complete search history.

(56) References Cited

U.S. PATENT DOCUMENTS 8,132,029 B2    3/2012  Alms
8,816,830 B2 *  8/2014  Lai ......................... G05B 19/19
                                                              318/286

(Continued)

FOREIGN PATENT DOCUMENTS

DE    102008057751 B    5/2010
EP        2190094 A     5/2010

OTHER PUBLICATIONS

Texas Instruments, May 1, 2014, "Introduction to Wireless Power" "Introduction to Wireless Power", pp. 1-49 (Year: 2014).*

*Primary Examiner* — Daniell L Negron
(74) *Attorney, Agent, or Firm* — Andrew Wilford

(57) ABSTRACT

A method of operating a system (1) having a first controller (2) to which a second controller (3) is connected, wherein the first controller (2) is connected via a data link (4) to the second controller (2) and exchanges data therebetween, and the first controller (2) is connected to the second controller (3) via a power link (5) and supplies the second controller (3) with power from a power source (7), characterized in that a sensor (8) of the first controller (2) is used to measure the current flow via the power link, and that the current flow is influenced by means of a load (13) of the second controller (3) for the purpose of data transmission between the two controllers (2 and 3) via the power link (5).

5 Claims, 3 Drawing Sheets

(56) References Cited

U.S. PATENT DOCUMENTS

2013/0043985 A1 2/2013 Lai et al.
2015/0303724 A1* 10/2015 Lin .................. H02J 7/007
 320/162

* cited by examiner

IMPLEMENTING A DIAGNOSIS CAPABILITY OF A NONAUTOMOTIVE CONTROLLER IN AN AUTOMOTIVE ENVIRONMENT

CROSS REFERENCE TO RELATED APPLICATIONS

This application is the US-national stage of PCT application PCT/EP2017/062159 filed 19 May 2017 and claiming the priority of German patent application 102016208671.5 itself filed 19 May 2016.

FIELD OF THE INVENTION

The invention relates to a system and method of operating a system having a first controller to which a second controller is connected, the first controller being connected via a data link to the second controller and exchanging data therethrough. In such a system, the first controller is also typically connected to the second controller via a power link and supplies the second controller with power from a power source.

BACKGROUND OF THE INVENTION

For quite some time, equipment from the consumer electronics sector has also been increasingly used in the automotive industry. However, many of the necessary components/controllers are often not suitable for automotive use because of temperature requirements, variability, humidity, shock, vibrations, and the like. This means that the hardware (driver modules) is not suited to some or any of the temperature ranges that are encountered in automotive environments.

In order to protect the hardware in this context, it is usually necessary for the entire controller having such a nonautomotive-compliant component, for example, to be switched off. Due to the variable installation location in a vehicle, however, there is often no reliable determination as to when the controller itself needs to be switched off, since the main controller or master control unit may have a different temperature than the controller. Belated disconnection can result in a malfunction or even to faults in the controller. Similarly, switching on in the critical temperature range can lead to a defect in the component.

To protect the hardware, the nonautomotive-compliant components are there operated in the controller only in the valid temperature range and switched off disadvantageously in case of a higher or lower temperature. The switch-off can also occur for other reasons.

The interfaces between the controllers can, but need not, be standard USB ports (1.0, 2.0, . . . ) Such an interface generally consists of 4 pins (VBus 5V, ground, D+, D-). If a device does not register with the host via the data lines (D+, D-), it is not possible to communicate via this USB interface.

OBJECT OF THE INVENTION

It is therefore the object of the invention to satisfy the abovementioned requirements and enable reliable data transmission between two controllers of a system.

SUMMARY OF THE INVENTION

With regard to the system, according to the invention the first controller has a sensor and the second controller forms a load. The load of the second controller, which is connected to the power link between the two controllers, affects the flow of current, and this influencing of the flow of current is detected by the sensor of the first controller. A defined current flow, such as for example an amperage that can fluctuate within predefinable limits, is determined during normal operation. These fluctuations are subject to the load of both controllers when for example data are exchanged. The bandwidth of these fluctuations can be specified. The load of the second controller makes it possible to influence the current flow between the two controllers so that the current flow can undershoot and/or overshoot the predetermined range. Departure from the range is selected such that, as a result, the normal power supply of the second controller is not adversely affected by the first controller. However, it is possible to change this current flow with the load, in which case the change can be detected by the sensor of the first controller. Appropriate evaluation of this changed current flow enables data transmission between the two controllers independently of the data link between the two controllers. This means that the power link of the two controllers is advantageously used for data transmission, and that this can be done independently of the actual existing data link between the two controllers. This either ensures a redundant data exchange between the two controllers, or data transfer continues to be possible in the event that, for whatever reason, the actual data link between the two controllers no longer allows data exchange.

With this invention, it is advantageously possible nonetheless to perform simple communication, such as a simple temperature or malfunction transmission, from one controller to another controller (for example a main controller) in a vehicle when other communication is not available.

In a development of the invention, the first controller has a control unit that is connected to the sensor. The control unit makes it possible to detect the parameters determined by the sensor—above all, the influenced current flow, but also the data exchanged via the data link—and to trigger appropriate actions. For this purpose, the control unit is embodied such that it records the data that is exchanged via the actual data link and further processes or sends its own data to the data link. In addition, the control unit is designed to detect the current flow affected by the sensor and to generate appropriate actions therefrom.

In a development of the invention, the second controller has a control unit that is connected to the load. This control unit is designed not only to ensure the exchange of data via the data link with the first controller, but also to enable data exchange via the power link between the two controllers. For this purpose, the control unit of the second controller can control the load in a pulsed manner, for example, in order to generate a square-wave current flow over the power link, with the pulsed current flow being a data stream that, in turn, can be detected by the sensor of the first controller and evaluated and further processed by the control unit of the first controller.

In a development of the invention, the additional control device is a USB-type memory and has a driver that is connected to the control unit. This makes it possible to use a controller that must be used according to the USB standard (in terms of data transmission, power supply, and mechanical connection) and to plug it into the first controller or connect it thereto by a cable and simultaneously establish a secure data link. As was also already pointed out above, the reliability of this data link derives from the fact that the data transmission is not only performed in the standard manner via the data link but rather can, alternatively or in addition, also be carried out via the power link between the two devices.

With regard to the method of operating a system, a provision is made according to the invention that a sensor of the first controller is used to measure the current flow via the power link, and that the current flow is influenced by a load of the second controller for the purpose of data transmission between the two controllers via the power link. Here again, there is the advantage that, in a normal operating case, the data transmission between the two controllers occurs via the data link, and the second controller, which is connected to the first controller, is supplied with power via a power link between these two controllers. If, for whatever reason, data transmission between the two controllers via the data link fails, malfunctioning, or down, the interaction between the load and the sensor enables the power link to be used not only for the power supply, but also for data transmission. It is also conceivable for a portion of the data to be transmitted via the data link and another portion of the data transmission to be transmitted via the power link between the two controllers.

As already explained above, in order to control data transmission between the two controllers via their power link, the sensor of the first controller is controlled by a control unit and the current flow measured by the sensor is evaluated by the control unit of the first controller. Likewise, the current flow is controlled by the load of the second controller. For this purpose, a control unit is provided in the second controller, so that the current flow is controlled via the control unit of this second controller.

In a development of the invention, the current flow is influenced in such a way that it results in a binary data stream. By influencing the current flow by the load of the second controller, which takes place via its control unit, it is possible, in addition to the normal power transfer between the two controllers, for the current flow to be pulsed, so that the sensor of the first controller detects a binary data stream that can be forwarded to the associated control unit and further processed. The binary data stream thus advantageously makes it possible to have additional or redundant data exchange in addition to the actual data link between the two control units.

BRIEF DESCRIPTION OF THE DRAWING

An embodiment of a system according to the invention that can be operated with the method according to the invention is explained below with reference to the figures, in which.

SPECIFIC DESCRIPTION OF THE INVENTION

Figure 1:
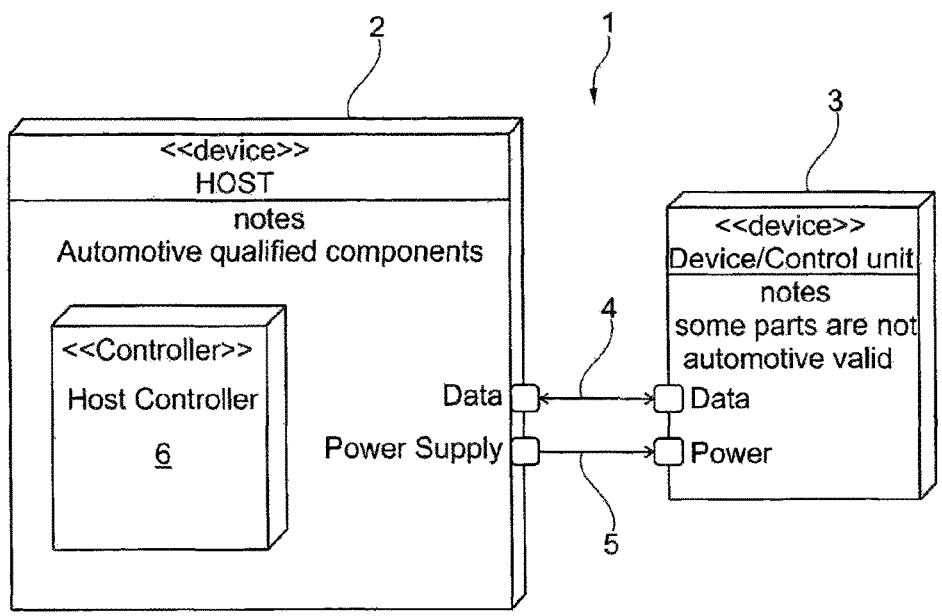
FIG. 1 is a simplified schematic diagram of the invention.

FIG. 1 shows a system 1 having a first controller 2 and a second controller 3. On the one hand, the two controllers 2 and 3 are connected by a data link 4 for data exchange and by a power link 5 for supplying power. The two links 4 and 5 are for example one cable, although it is also possible for the second controller 3 to have a corresponding integral plug so that it can be plugged into a corresponding mating jack integrated into the first controller 2. The link for the data exchange and the power supply and the mechanical connection between the two controllers 2 and 3 preferably comply with the USB standard. The mechanical connection between the two controllers 2 and 3 can but need not be compliant with the USB standard, for example a consumer USB standard. It is also conceivable for a plug connection according to another general or proprietary standard to be used. For example, plug connections that meet automotive requirements, such as FAKRA connectors, can also be employed.

Figure 2:
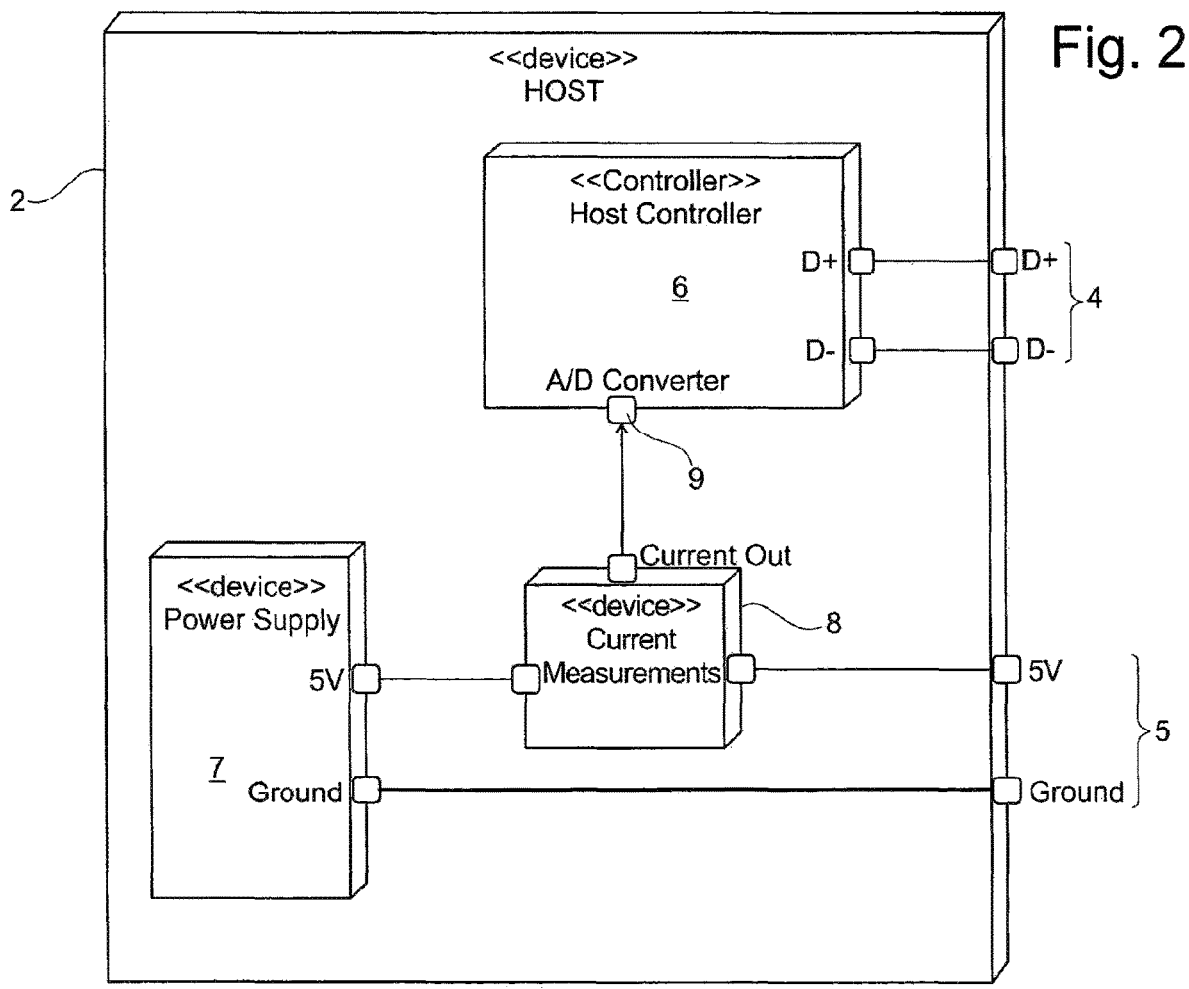
FIGS. 2 and 3 are respectively somewhat more detailed schematic views of the two controllers of the invention.

FIG. 2 shows the first controller 2 with essential elements. It has a control unit 6 that is connected to the data link 4. Moreover, the first controller 2 has a power source 7 for supplying power via the power link 5 to the second controller 3. A sensor 8 is connected to this power link 5 between the second controller 3 and the power source 7. The sensor 8 detects current flow of the power link 5 and reports to the control unit 6. The control unit 6 is designed to evaluate the current flow measured by the sensor 8, to process it, and to generate appropriate actions therefrom within the first controller 2 and/or to deliver the processed data via an (unillustrated) interface to additional (also unillustrated) devices. In the embodiment according to FIG. 2, the control unit 6 has an A/D converter that converts the current flow measured analogously with the sensor 8 into a digital signal that can be further processed by the control unit 6. The power source 7 of the first control device 2 is for example a standard or rechargeable battery that for example outputs 5 v via the power link 5. Other voltage ranges are conceivable, of course, with 5 v usually being used according to the USB standard. Although the A/D converter is in the control unit 6 in the embodiment according to FIG. 2, it is also conceivable for the A/D converter to be an individual, i.e. separate, component so as to be offset from the control unit 6. In this case, the A/D converter can be connected to the control unit 6 via an appropriately embodied communication point and exchange signals via this interface therewith.

Figure 3:
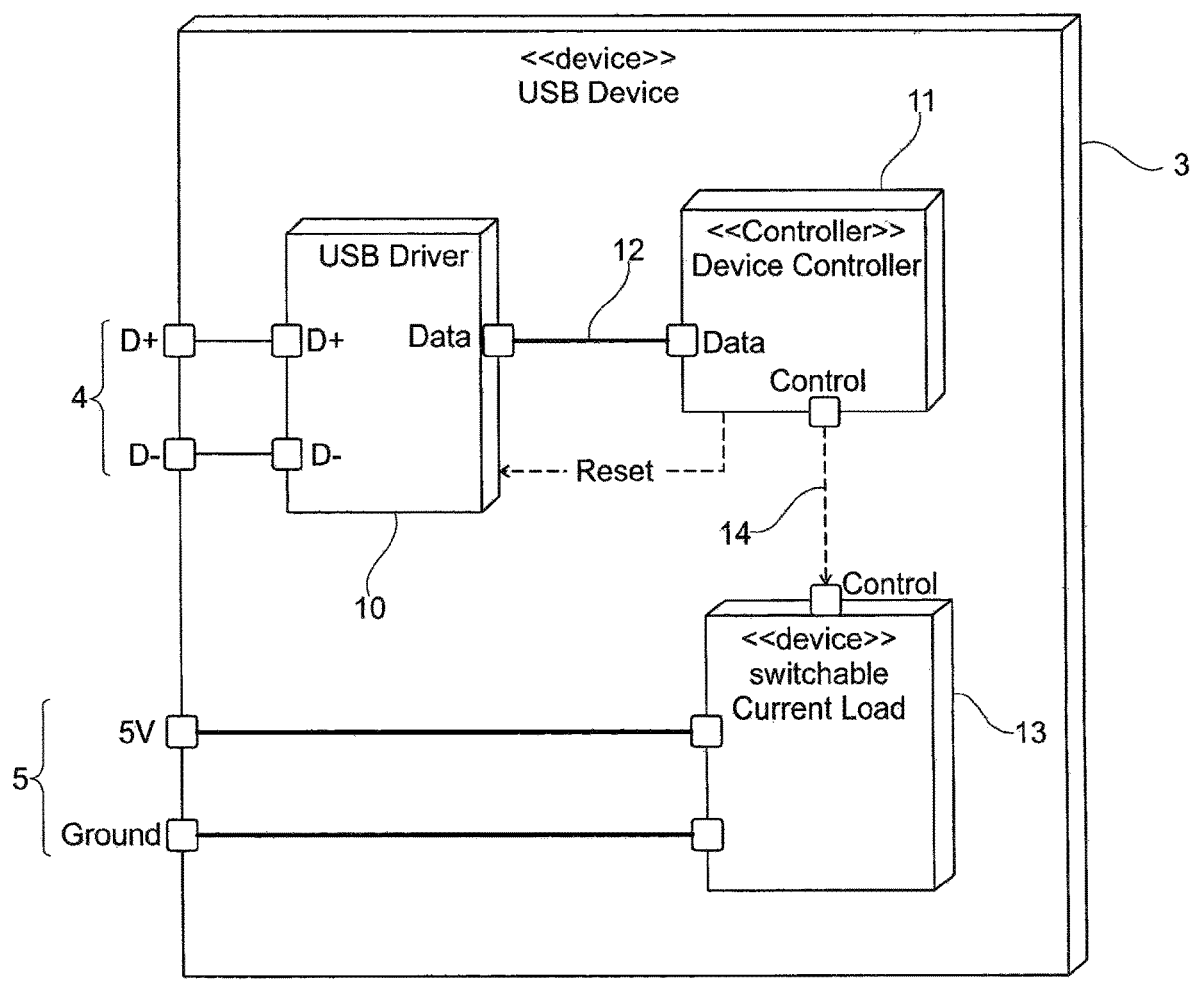

FIG. 3 shows details of the second controller 3. As is customary, it has a driver 10 with which data exchange between the two controllers 2 and 3 is conducted when the second controller 3 is connected to the first controller 2. In this embodiment, the second controller 3 is a USB device, but it does not have to be. It is for that reason that the driver 10 is also referred to as a USB driver. Furthermore, the second controller 3 has a control unit 11 that is connected via a data link 12 to the driver 10 for data exchange between the two controllers 2 and 3. Furthermore, the second controller 3 has a load 13, in particular a switchable load. The load 13 is connected by a control link 14 to the control unit 11. The load 13 is controlled via the control unit 11, particularly in a pulsed manner. As a result of the controlling of the load 13 via the control unit 11, current flow is influenced via the power link 5, preferably in a pulsed manner. This occurs in addition to the actual power supply, so that, despite the influence of the load 13 with respect to the actual power supply of the second controller 3, the actual power supply is not adversely affected by the first controller 2 via the power link 5. The control unit 11 of the second controller 3 is designed, on the one hand, to manage the data transmission between the two controllers 2 and 3 via the data link 4 and the driver 10 and, at the same time, to enable data exchange via the power link 5 between the two controllers 2 and 3 by controlling the load 13. This data exchange via the power link 5 takes place either in addition to the data exchange via the data link 4 or only via the power link 5 if the data link 4 is faulty or down.

Figure 4:
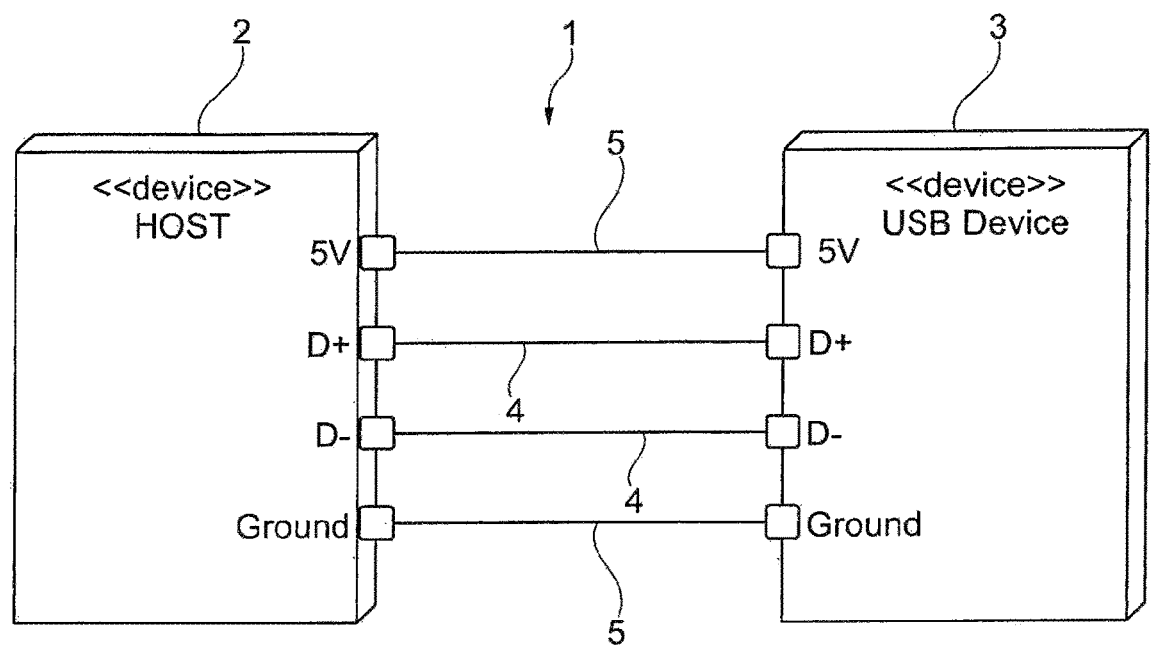
FIG. 4 is another diagram of the system with the controllers indicated schematically and the power and data links shown in some detail.

FIG. 4 once again shows the basic system 1 according to the invention, in which the first controller 2 is an arbitrary control device and the second controller 3 is a USB-type memory. However, the second controller 3 need not be just a storage unit, but rather it can also be any other control device.

Figure 5:
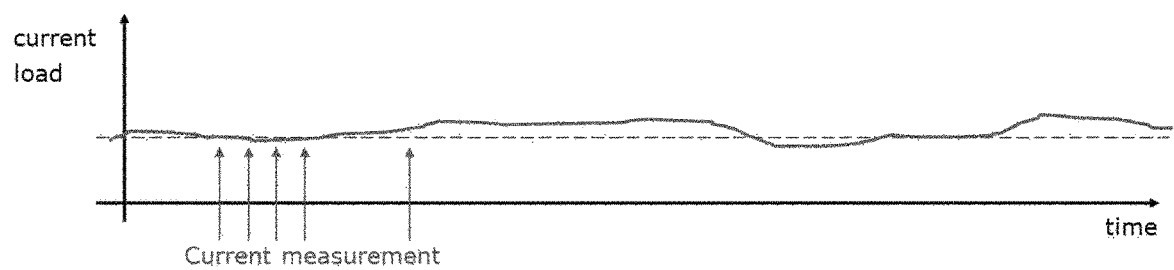
FIGS. 5 and 6 respectively show the power flow between the two controllers respectively with and without control.
Figure 6:
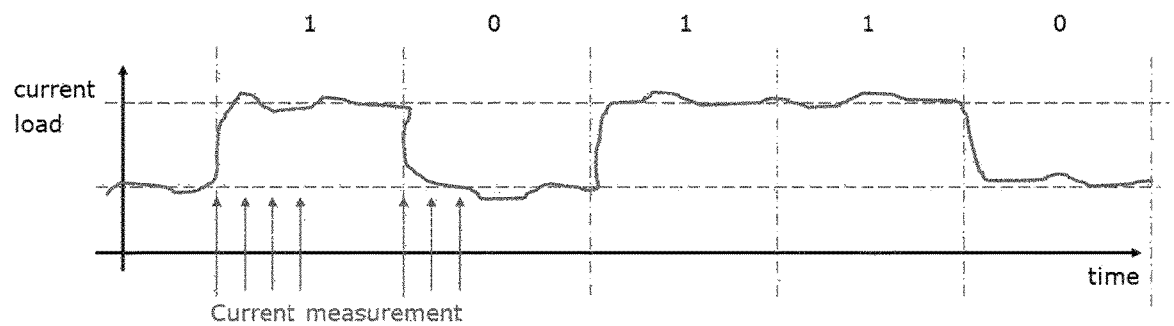

FIGS. 5 and 6 show the current flow between the two controllers 2 and 3 via the power link 5 without (FIG. 5) and with influence (FIG. 6).

FIG. 5 is a graph of the current flow via the power link 5 between the two controllers 2 and 3 over time (x axis). It can be seen that the current flow can fluctuate in size (y axis) in a certain bandwidth (around the dashed line).

FIG. 6 is a graph of the current flow over time influenced, preferably in a pulsed manner, by appropriate control by the load 13 of the second controller 3. The size of the load 13 is set such that, when it is actuated, for example, the amperage (y axis) increases and falls back to the predetermined level (the dashed line in FIG. 5) when it is switched off. This pulsing creates a binary data stream that can thus be transmitted via the power link 5 to the first controller 2 and evaluated and forwarded by the sensor 8. For clarification, a numerical sequence of "1", "0", "1", "1", "0" is shown in FIG. 6 as an exemplary data stream. This is purely for the sake of example and of course depends on the loading of the circuit by the appropriately controlled load 13. A square-wave pattern does not necessarily have to be produced; rather, a non-pulsed influencing of the current flow through the load 13 that is not pulsed but represents a continuously variable (for example sinusoidal) current flow is also conceivable. As will readily be understood, the influencing of the current flow by the load 13 is selected such that the actual power supply of the second controller 3 is not or not substantially impaired by the first controller 2.

The invention claimed is:

1. A method of operating a system having:
   a first controller,
   a second controller forming a load,
   a USB-standard data link extending between and connecting the first controller to the second controller for data exchange therebetween,
   a power supply in the first controller, and
   a USB-standard power link that is separate from the USB-standard data link, that connects the first controller to the second controller, and that supplies the second controller with power from the power source,
the method comprising the steps of:
   providing a sensor in the first controller,
   the sensor of the first controller measuring current flow through the USB-standard power link, and
   varying the current flow through the load of the second controller for transmitting data between the two controllers through the USB-standard power link.

2. The method according to claim 1, further comprising the step of:
   evaluating current flow measured with the sensor by a control unit of the first controller.

3. The method according to claim 1, wherein the current flow is controlled by the load of the second controller.

4. The method according to claim 2, wherein the current flow is controlled by a control unit of the second controller.

5. The method according to claim 1, wherein the current flow is influenced in such a way that it results in a binary data stream.

* * * * *